(12) United States Patent
Adamczak (10) Patent No.: US 11,040,703 B1
(45) Date of Patent: Jun. 22, 2021

(54) MULTIFUNCTION WINDSHIELD WIPER WITH DISTRIBUTION OF FLUID AND AIR ASSEMBLED WITH FLEXIBLE JOINTS

(71) Applicant: Gregory Mark Adamczak, Stamford, CT (US)

(72) Inventor: Gregory Mark Adamczak, Stamford, CT (US)

( * ) Notice: Subject to any disclaimer, the term of this patent is extended or adjusted under 35 U.S.C. 154(b) by 0 days.

(21) Appl. No.: 17/095,903

(22) Filed: Nov. 12, 2020

(51) Int. Cl.
| | | |
|---|---|---|
| B60S 1/40 | (2006.01) | |
| B60S 1/50 | (2006.01) | |
| B60S 1/34 | (2006.01) | |
| B60S 1/52 | (2006.01) | |
| B60S 1/38 | (2006.01) | |
| B60S 1/54 | (2006.01) | |

(52) U.S. Cl.
CPC ................ *B60S 1/40* (2013.01); *B60S 1/345* (2013.01); *B60S 1/3415* (2013.01); *B60S 1/3418* (2013.01); *B60S 1/3461* (2013.01); *B60S 1/3486* (2013.01); *B60S 1/3874* (2013.01); *B60S 1/50* (2013.01); *B60S 1/524* (2013.01); *B60S 1/54* (2013.01); *B60S 1/546* (2013.01); *B60S 1/3459* (2013.01); *B60S 2001/3813* (2013.01); *B60S 2001/3815* (2013.01); *B60S 2001/3824* (2013.01); *B60S 2001/3836* (2013.01)

(58) Field of Classification Search
CPC .... B60S 1/40; B60S 1/50; B60S 1/524; B60S 1/3415; B60S 2001/3813; B60S 2001/3815; B60S 2001/3836; B60S 2001/3824; B60S 1/3877; B60S 1/54; B60S 1/542; B60S 1/546; B60S 1/345; B60S 1/3461; B60S 1/3418; B60S 1/3486; B60S 1/3459
USPC ............ 15/250.04, 250.361, 250.44, 250.46, 15/250.48, 250.32, 250.34, 250.351
See application file for complete search history.

(56) References Cited

U.S. PATENT DOCUMENTS

| | | | | |
|---|---|---|---|---|
| 2,186,193 | A * | 1/1940 | Christen | B60S 1/38 15/250.4 |
| 2,336,007 | A * | 12/1943 | Fuller | B60S 1/522 15/250.04 |
| 2,348,502 | A * | 5/1944 | Smulski | B60S 1/524 15/250.04 |
| 2,432,690 | A * | 12/1947 | Smulski | B60S 1/4064 15/250.04 |

(Continued)

FOREIGN PATENT DOCUMENTS

| | | | |
|---|---|---|---|
| DE | 2338496 | * | 2/1975 |
| GB | 371963 | * | 5/1932 |
| WO | 99/29546 | * | 6/1999 |

*Primary Examiner* — Gary K. Graham
(74) *Attorney, Agent, or Firm* — Robert J. Hess; Hess Patent Law Firm (57) ABSTRACT

A multifunction windshield wiper includes a wiper arm, a wiper blade holder, and a wiper blade to facilitate, through channels, the direct distribution of the liquid or an air on the windshield surface. The direct distribution of the liquid and an air maximize the wiping effect and minimizes their usage. The wiper arm is assembled with wiper blade holder within the flexible spherical joints to refine the contact with a curved surface during the operational movement of the windshield wiper in the different weather conditions. The windshield wiper arm has a flexible joint with the link arm to facilitate the tension on the windshield surface during the wiping process.

11 Claims, 10 Drawing Sheets

(56) References Cited

U.S. PATENT DOCUMENTS

| | | | | | |
|---|---|---|---|---|---|
| 2,520,896 | A | * | 8/1950 | Smulski | B60S 1/3415 285/190 |
| 2,543,383 | A | * | 2/1951 | Scinta | B60S 1/3877 15/250.4 |
| 2,582,717 | A | * | 1/1952 | Pierce | B60S 1/48 15/250.04 |
| 2,598,971 | A | * | 6/1952 | Carey | B60S 1/4087 15/250.32 |
| 2,792,585 | A | * | 5/1957 | Scinta | B60S 1/3801 15/250.451 |
| 2,877,106 | A | * | 3/1959 | Aspegren | C21B 13/008 75/474 |
| 3,218,664 | A | * | 11/1965 | Wise | B60S 1/40 15/250.44 |
| 3,371,368 | A | * | 3/1968 | Walker | B60S 1/546 15/250.04 |
| 3,591,887 | A | * | 7/1971 | Keddie | B60S 1/48 15/250.02 |
| 5,647,085 | A | * | 7/1997 | Edele | B60S 1/3486 15/250.21 |

\* cited by examiner

MULTIFUNCTION WINDSHIELD WIPER WITH DISTRIBUTION OF FLUID AND AIR ASSEMBLED WITH FLEXIBLE JOINTS

FIELD OF THE INVENTION

The present invention relates to a multifunction windshield wiper. Specifically, the present invention relates to the multifunction windshield wiper with the distribution of the fluid and an air, assembled with the flexible joints.

The windshield wiper of the present invention allows selection the distribution of the fluid or an air through the channels in a wiper blade holder per the weather condition.

The windshield wiper arm and the wiper blade holder are assembled with flexible spherical joints. Such flexible assembly maximizes uniform contact the engage elements of the wiper blade with the curved surface of the windshield.

The direct distribution of the fluid or an air through the channels in the blade wiper holder minimizes the usages of the fluid or an air during the wiping process. Additionally, providing hot air improves the melting process of the snow or the frost accumulated on the windshield. The direct flow of the liquid or the air refine the removal of the dust accumulated on the windshield surface and minimize the scratches.

The flexibility of the windshield wiper blade holder and the stiffened structure of the wiper arm facilitate better contact with the windshield during the whipping process.

The accommodation of the multifunction windshield wiper to the existing automobile windshield wiper liquid, an air and linkage systems are not in the scope of the present invention.

BACKROUND OF THE INVENTION

The optional criteria for the windshield wiper is to maximize the performance in the providing clear vision through the windshield and minimize the risk factor during driving in the various whether condition.

In general, the windshield wiper employs a wiper blade, a blade holder arm, a wiper arm, a linkage arm, a wiper motor, a wiper relay intermittent, a washer wiper switch, a wiper fluid container, a fluid pump and a washer nozzle.

The distribution of the fluid through the nozzle on the windshield is not timely controlled with the movement of the wiper and as a result, during the various driving conditions, the washer fluid spreads on the windshield, on the side windows, and even on the roof of the vehicle. Such an uncontrolled distribution of the washer fluid maximizes their usage. Additionally, the accumulated dust on the windshield is not being removed timely, resulting in scratches of the surface during the wiping process.

SUMMARY OF THE INVENTION

It is an object of the present invention to provide a multifunction windshield wiper, with the selection of the liquid or the flow of air or the combination liquid/cold air/hot air in the wiping process, during different weather conditions.

It is an object of the present invention to provide the flexible spherical joints to assemble the wiper arm with wiper blade holder.

It is an object of the present invention to provide the windshield wiper with a flexible wiper blade holder and with the stiff structure of the wiper arm assembled with flexible spherical joints.

It is an object of the present invention to provide the windshield wiper with the blade holder assembly for the wiper blade with by a flexible insert.

It is an object of the present invention to provide the wiper blade arm with the channels for supplying the fluid or an air to the wiper blade holder.

It is an object of the present invention to provide the wiper blade holder with the channels for the uniform distribution of the fluid or an air on the windshield.

It is an object of the present invention to provide the torque to the wiper arm to facilitate the tension on the windshield.

It is an object of the present invention to provide torque to the wiper arm in the tilt position.

BRIEF DESCRIPTION OF THE DRAWINGS

FIG. 4A is an enlarged partial view of the windshield wiper of FIG. 4.

DETAILED DESCRIPTION OF THE INVENTION

Exemplary embodiments of the present invention may be further understood with reference to the following description and related appended drawings.

Referring to the FIGS. 1-13, the windshield wiper is provided. The windshield wiper includes the windshield wiper arm 1, the link arm 2, the wiper blade holder 3, the wiper blade 4, the flexible blade insert 60, the flexible spherical insert 80, the spacer 90, and the seal rings 53.

Figure 3:
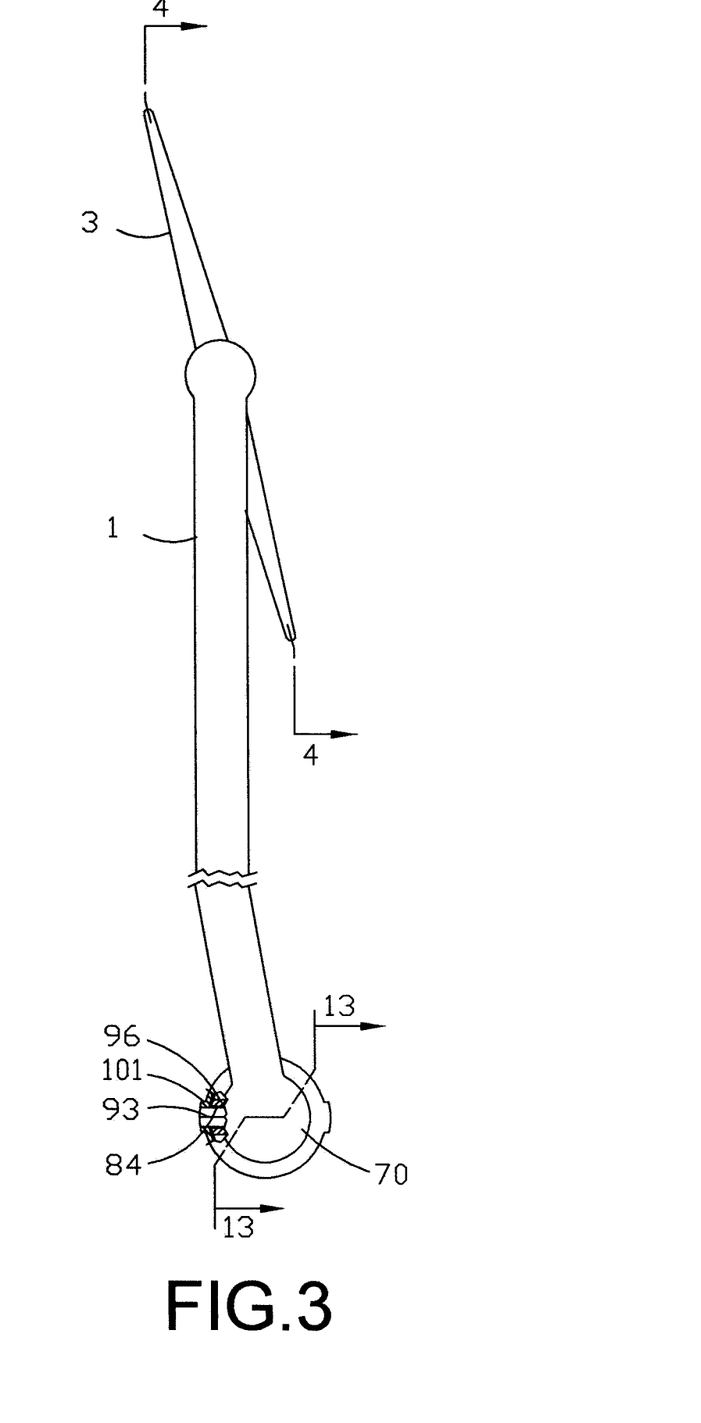
FIG. 3 is a side view of the windshield wiper of FIG. 1.
Figure 4:
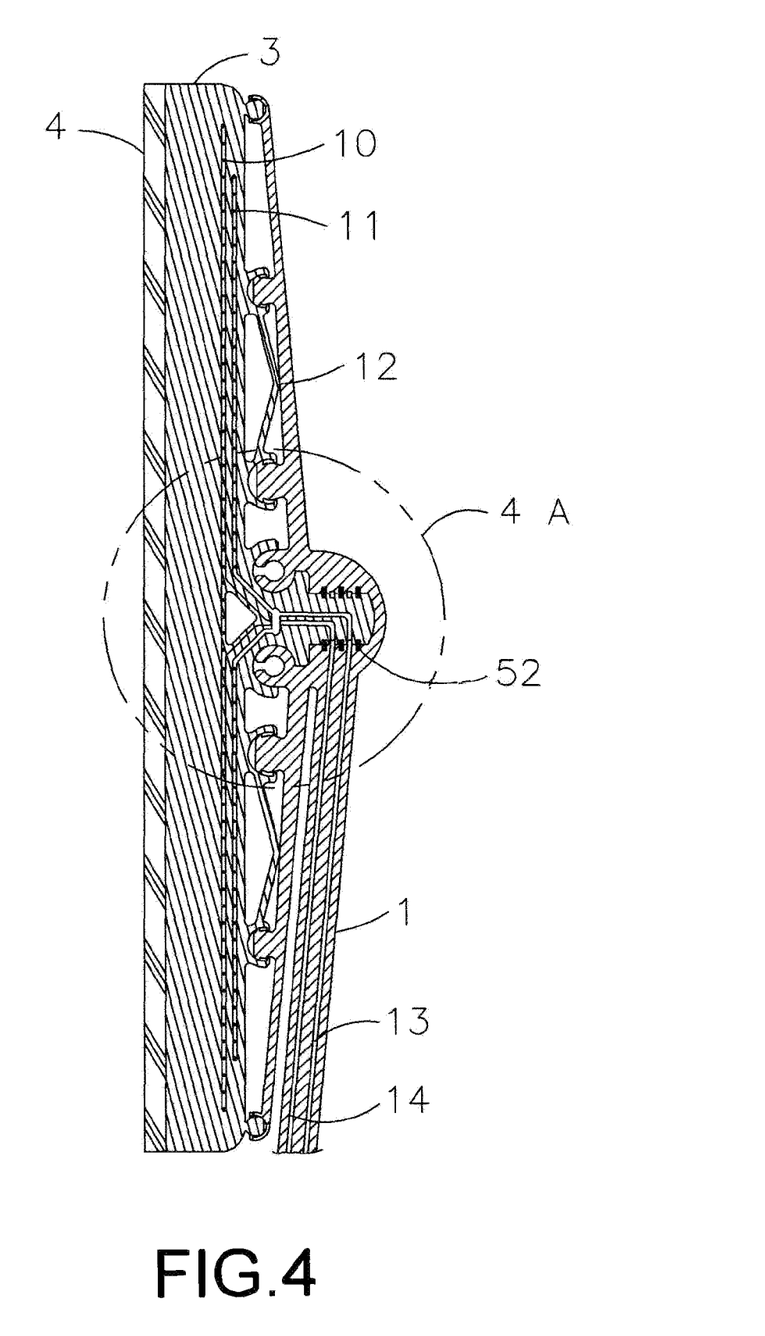
FIG. 4 is an enlarged, sectional view of the windshield wiper of FIG. 3 taken across line 4-4.
Figure 5:
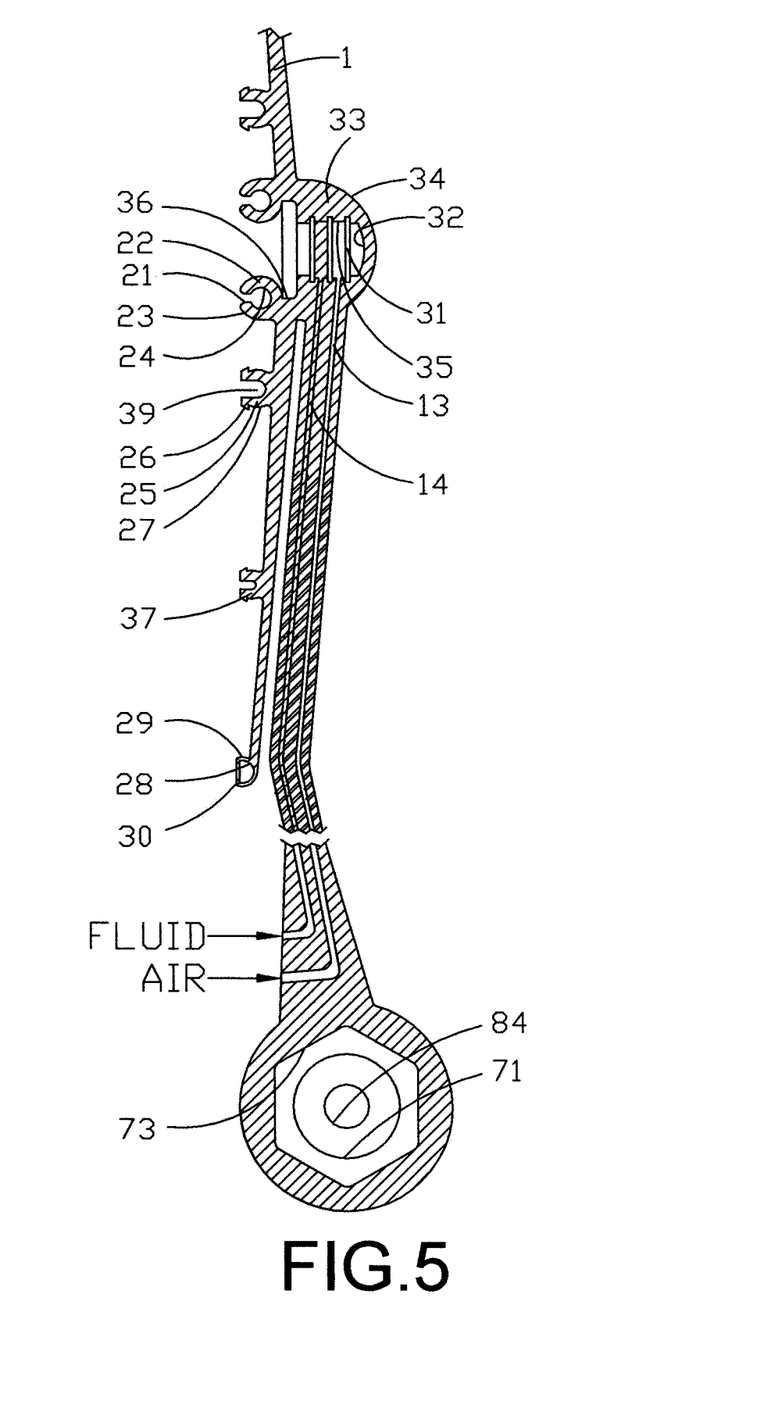
FIG. 5 is an enlarged, front view of wiper arm with partial cross section of the windshield wiper of FIG. 1.
Figure 13:
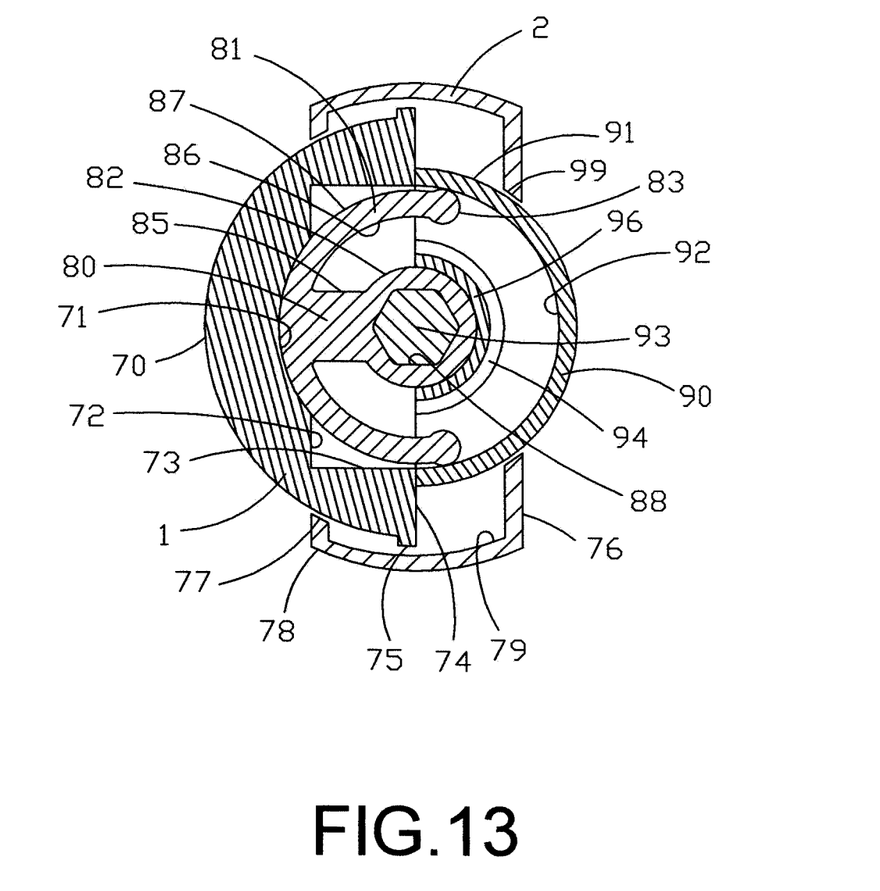
FIG. 13 is an enlarged, sectional view taken across section line 13-13 of the windshield wiper of FIG. 3.

The windshield wiper arm 1 in FIGS. 1-5 and in FIG. 13 has an extruded frame shape with extruded clips 30, protruded clips 25, extruded mount clips 22, and, in the middle, a spherical protrusion 33. The extruded clips 30 each has an inner spherical surface 28 and an outer spherical surface 29. The protruded clips 25 each has an outer spherical surface 26, 27 and a slot 39. The extruded mount clips 22 each has an outer spherical surface 23, an inner spherical surface 24 and a slot 21. The middle spherical protrusion 33 has an outer spherical surface 34, an inner spherical surface 32, a cylindrical cavity 35, the seal grooves 31, and a cylindrical groove 36. The windshield wiper arm 1 has a fluid channel 14 and an air channel 13 to provide the flow of the liquid and the air to the corresponding channel 15 and 16 of the wiper blade holder 3. The fluid channel 14 and an air channel 13 are in the form of cylindrical holes connected with cylindrical cavity 35 and are to be adapted to the existing automobile fluid and air system. Furthermore, with reference to FIG. 13, the windshield wiper arm 1 has a protrusion 70 with a cavity in a hexagonal shape 73 and having a flat surface 74, an inner spherical surface 71 and, as indicated in FIG. 5, a cylindrical opening 84.

Figure 6:
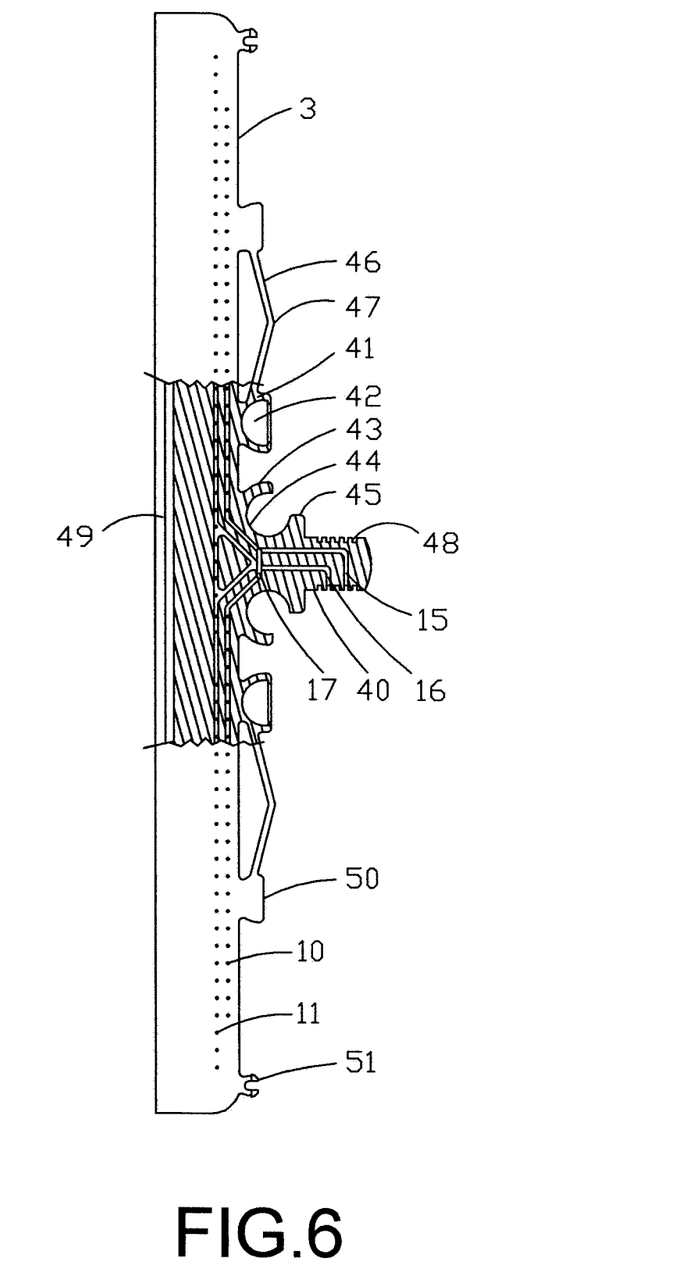
FIG. 6 is an enlarged, front view of the wiper blade holder with partial cross section of the windshield wiper of FIG. 1
Figure 7:
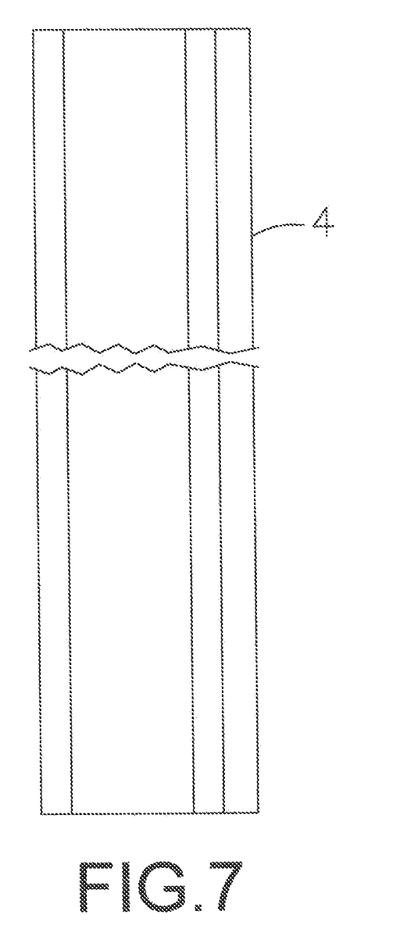
FIG. 7 is an enlarged front view of the wiper blade of the windshield wiper of FIG. 1.
Figure 8:
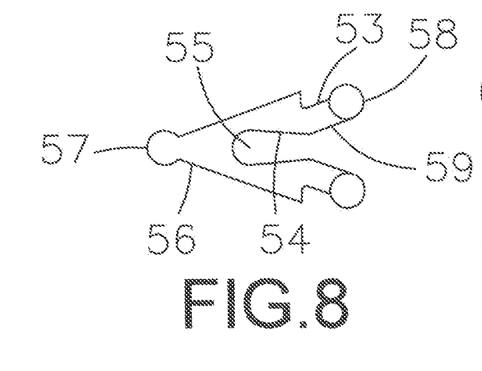
FIG. 8 is a bottom view of the wiper blade of FIG. 7.
Figure 11:
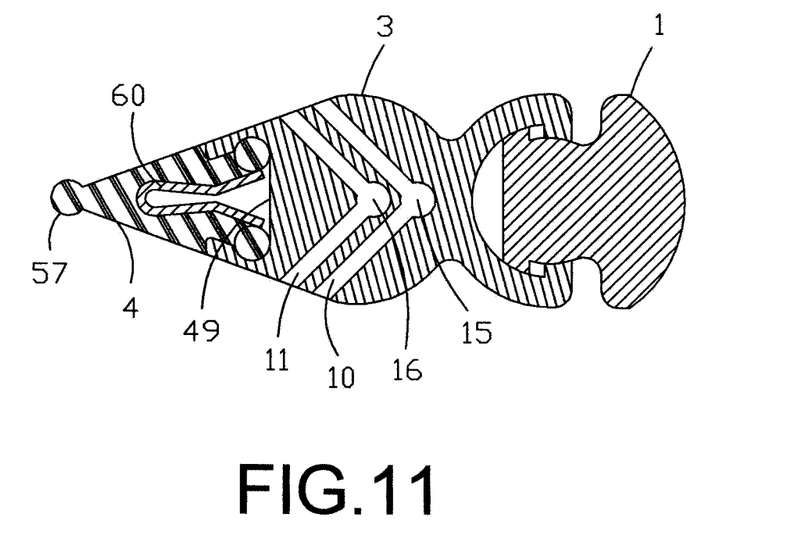
FIG. 11 is an enlarged, sectional view taken across section line 11-11 of the windshield wiper of FIG. 1.
Figure 12:
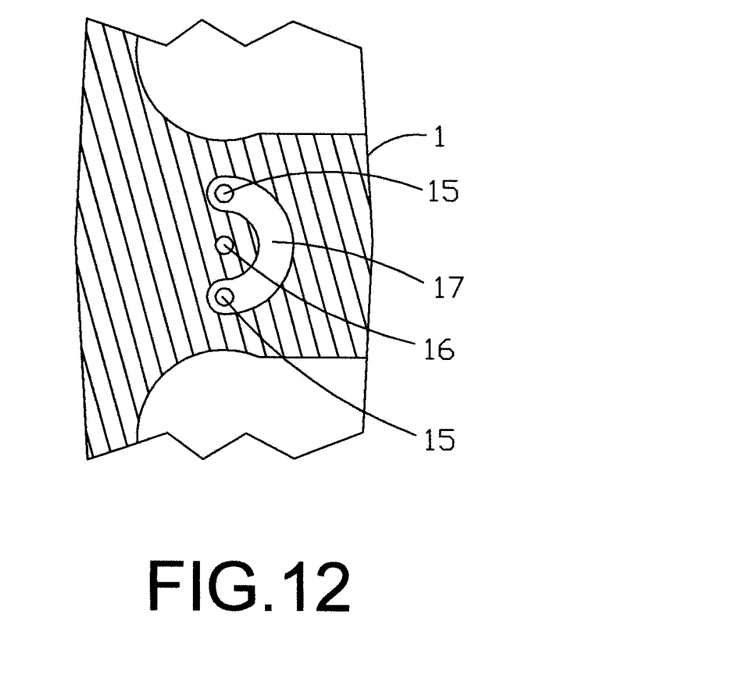
FIG. 12 is an enlarged, sectional view taken across section line 12-12 of the windshield wiper of FIG. 1.

As shown in FIG. 6 and in FIG. 11, the windshield wiper blade holder 3 has an extruded frame "V" shape with the set of clips 41, 50, 51, a cavity 42, a "V" shape flexible stiffener 46 joint on a bending surface 47, a spherical extrusion 43 with an inner spherical surface 44 that is adjusted with a cylindrical flange 45, a cylindrical shoulder 40, and the cylindrical seal grooves 48. The wiper blade has liquid channels 16 and an air channel 15 with a bypass airflow 17 as indicated in FIG. 12 and are connected to the corresponding channels 13, 14 of the windshield wiper arm 1. Both sides of the sidewall of the blade holder 3, as shown on FIG. 11, contain a row of equally spaced apart cylindrical holes 10, 11, which are each connected angularly with a corresponding one of the liquid channels 16 and with an air channel 15 for the direct and uniform distribution of the washer fluid/an air on the windshield. Furthermore, wiper holder 3 provides the groove 49 to mount the wiper blade 4.

As shown on FIGS. 7-11 the wiper blade 4 is in the "V" shape to fit the groove 49 of the wiper blade holder 3, and with an opening 55 in the middle to fit the outside "V" shape of flexible insert 60 and having the declined surface 53, 59, the inclined surface 54, 56 and the set of the cylindrical protrusions 58. In addition, the wiper blade 4 has a cylindrical tip 57 to provide contact with the windshield.

Figure 9:
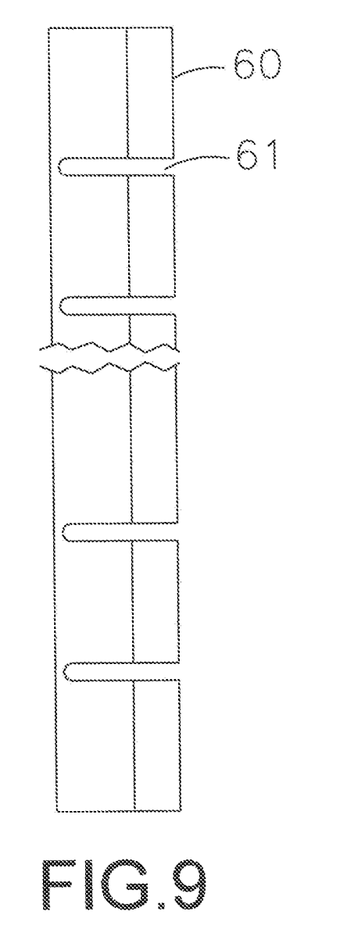
FIG. 9 is an enlarged, front view of the flexible insert of the windshield wiper of FIG. 11.
Figure 10:
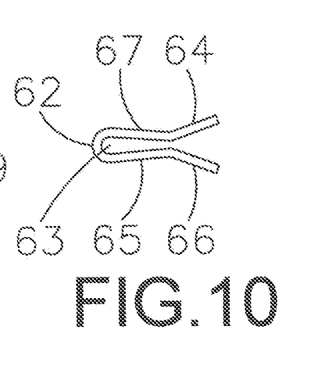
FIG. 10 is a bottom view of the flexible insert of FIG. 9.

As shown on FIGS. 9 and 10, the wiper blade 4 has a flexible blade insert 60 that is in the "V" shape, with the opening 63 in the middle, having declined surfaces 64, 65 and inclined surfaces 66, 67 joined about the bending surface 62, to accommodate the opening 55 of the wiper blade 4. Additionally, the flexible insert 60 has the slot 61 for better distribution of the tensional contact with the opening 55 of the wiper blade 4.

Referring to the FIG. 13, the wiper arm 1, the link arm 2, the flexible spherical insert 80, the spacer 90, and a hexagonal shaft 93 form the flexible spherical joints to facilitate an operational radial and the tilt movement of the windshield wiper 1. The protruded wiper arm 1 includes an outer spherical surface 70, a protruded shoulder 96 with cylindrical holes 84 (as seen on FIG. 5), a hexagonal cavity 73 with an inner spherical surface 71 joined about the flat surface 72, and a spherical lip 75 with an adjusted flat surface 74. The flexible spherical insert 80 is formed by four (4) arrayal located arms 81 having an outer spherical surface 87 and an inner spherical surface 86 that terminate at spherical tips 83 and having a sleeve 82 with a hexagonal opening 88 joined centrally about a cylindrical post 85. The spacer 90 is formed by the outer spherical surface 91, the inner spherical surface 92 with centrally located clearance hole 94 for the shoulder 96 and is rested on the flat surface 74 of the extrusion 70 of the wiper arm 1. The hexagonal shaft 93 is pressed in the hexagonal opening 88 of the flexible spherical insert 80 and in the hexagonal opening in the hub 101 (as seen on FIG. 3) of the link arm 2 and is projected in the clearance hole 84 of the wiper arm 1.

The link arm 2 as shown in FIG. 3 and in FIG. 13 is in the extruded form, having an outer spherical surface 78 and an inner spherical surface 79, a lip 77, a web 76 with centrally located opening 99 to accommodate the spacer 90. The link arm 2 can be adapted to the automobile linkage system for the operational movement of the windshield wiper 1 of the present invention.

The windshield wiper on FIG. 1-13 assembly is formed by the subassembly; the windshield wiper arm 1 with the wiper blade holder 3, the wiper blade holder 3 with the wiper blade 4 and with the flexible insert 60, and the wiper arm 1 with the link arm 2.

The typical assembly, as shown on FIGS. 4-6, has the outer clips 25, 30, 37 of the wiper arm 1 locking in corresponding ones of the inner clips 41, 50, 51 of the wiper blade holder 3, which results a spring effect in the flexible spherical joints. Furthermore, the windshield wiper arm 1, outer clip 22, cylindrical mount groove 36, the inner cylindrical surface 35, the seal grooves 31, the inner spherical surface 32 are locking in the inner clip 43, the flange 45, the cylindrical shoulder 40, and the seal rings 52 in the seal grooves 48 of the blade holder 3. The seal rings 52 assembled with the grooves 48 of the blade holder 3 and with the grooves 31 of the windshield wiper arm 1 separate the washer fluid channel 14 from a the air channel 13.

As shown on FIGS. 4, 4A, 8, 10 and on FIG. 11, the wiper blade holder 3 is assembled with wiper blade 4 and with the flexible insert 60 by sliding them in the groove 49 of wiper blade 3. The flexible insert 60 in the assembly provides tension to the wiper blade holder 3 and to the wiper blade 4 resulting in uniform contact with the windshield.

Figure 1:
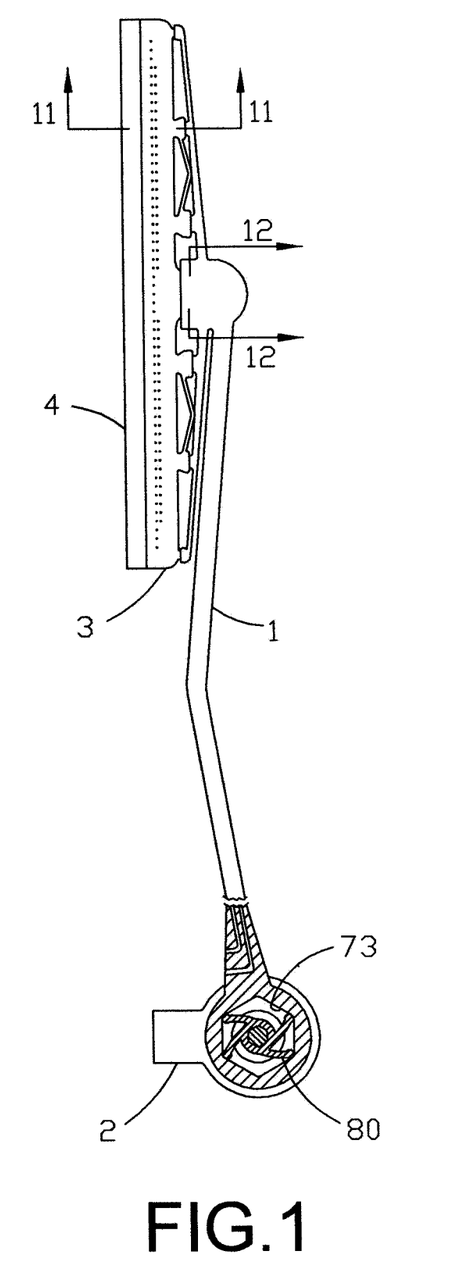
FIG. 1 is a front view of the windshield wiper of the present invention.
Figure 2:
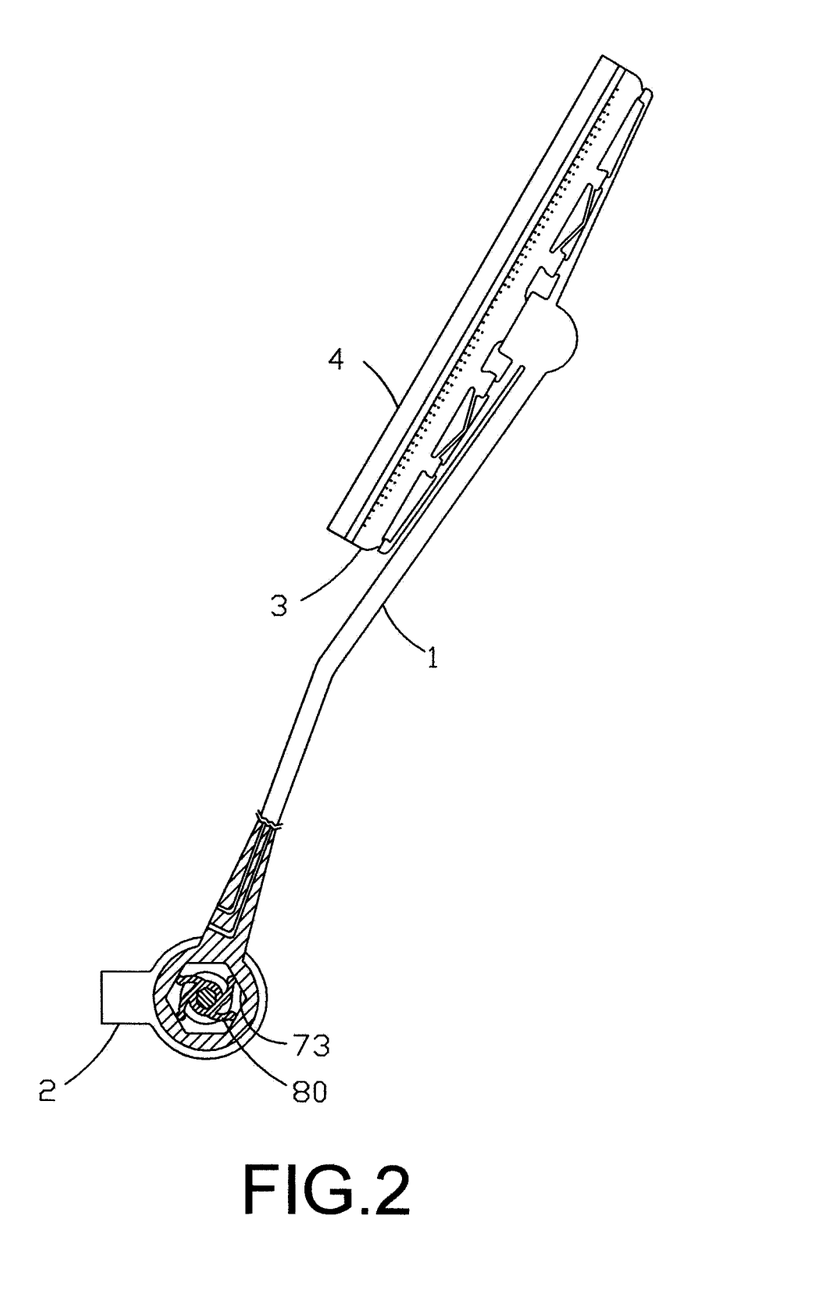
FIG. 2 is a front view of the windshield wiper of FIG. 1 in the tilt position.

As shown in FIGS. 1-3 and in FIG. 13, the windshield wiper arm 1 is assembled with an arm link 2, forming the flexible spherical joints by the flexible spherical insert 80, the hexagonal shaft 93 and the spacer 90 to facilitate the operational movement. As the tips 83 of the flexible spherical insert 80 are sliding on the wall of the hexagonal cavity 73 and on the inner spherical surface 92 of the spacer 91, the arms 81 deflect, causing the tension in the flexible spherical joints in radial and tilting position and providing the torque during the operational movement of the windshield wiper.

Various changes may be made to the structure embodying the principles of the invention. The foregoing embodiments are set fourth in an illustrative and not a limiting sense. The scope of the invention is defined by the claims appended hereto.

What is claimed is:

1. A windshield wiper, comprising;
    a wiper arm assembled with a wiper blade holder;
    flexible spherical joints between the wiper arm and the wiper blade holder, the wiper arm being connected to an arm link;
    a single flexible spherical joint between the wiper arm and the arm link, the wiper arm and the wiper blade holder each having a respective fluid channel in connection with each other to provide distribution of washer fluid onto a windshield and each having a respective air channel in connection with each other to provide distribution of air onto the windshield; and
    wherein the wiper arm and the wiper blade holder together have a set of seal rings that separate the respective fluid channel of the wiper arm and the respective air channel of the wiper arm from each other, the wiper blade holder being assembled with a wiper blade and with a flexible insert, which provides tension to the wiper blade that results in uniform contact of the wiper blade with the windshield.

2. The windshield wiper of claim 1, wherein outer clips of the wiper arm are locking in with inner clips of the wiper blade holder in a deflecting manner, resulting in tension in the flexible spherical joints.

3. The windshield wiper of claim 2, wherein surfaces of the outer clips of the wiper arm and surfaces of the inner clips of the wiper blade holder together form the flexible spherical joints.

4. The wiper arm of claim 3, wherein the inner clips are arranged to deflect, which results in a spring reaction in the flexible spherical joints that facilitates the uniform contact of the wiper blade on the windshield.

5. The windshield wiper of claim 1, wherein the wiper arm is assembled with the arm link, which has a flexible spherical insert, a hexagonal shaft and a spherical spacer.

6. The windshield wiper of claim 5, wherein arms of the flexible spherical insert have tips that are sliding on a wall of a hexagonal cavity and an inner spherical surface of the spherical spacer so that the arms deflect, causing tension in the single flexible spherical joint in a radial and tilting position and facilitate creation of a torque during operational movement of the windshield wiper.

7. The windshield wiper of claim 1, wherein the respective fluid channel of the wiper arm and the respective air channel of the wiper arm are arranged along the wiper blade holder.

8. The windshield wiper of claim 1, wherein the respective fluid channel of the wiper arm and the respective air channel of the wiper arm are connected angularly with corresponding ones of the respective fluid channel of the wiper blade holder and the respective air channel of the wiper blade holder.

9. The windshield wiper of claim 1, wherein the wiper blade further comprises a "V" shape to accommodate a groove of the blade holder, the flexible insert, with the wiper blade having a cylindrical tip arranged to make contact with the windshield.

10. The windshield wiper of claim 1, wherein the wiper blade holder includes a bypass channel to separate the fluid channel from the respective air channel in the wiper blade holder to allow a distribution of the fluid and the air onto the windshield, the bypass channel having curvature that goes partially around of the respective fluid channel in the wiper blade holder.

11. The windshield wiper of claim 1, wherein the wiper blade holder has an exterior that converges, the wiper blade having an exterior that tapers toward a cylindrical tip of the wiper blade, the wiper blade holder and the wiper blade being configured with respective formations that engage each other, the flexible insert being in an abutting relation with the wiper blade and having a structure that extends in a diverging manner to terminate adjacent to respective cylindrical protrusions of the wiper blade.

\* \* \* \* \*